United States Patent [19]

Kawasaki et al.

[11] 3,861,573

[45] Jan. 21, 1975

[54] TAPE TRANSPORT SYSTEM

[75] Inventors: Itaru Kawasaki; Kazutsugu Kobayashi; Yasuo Yamataka, all of Osaka, Japan

[73] Assignee: Matsushita Electric Industrial Co., Ltd., Osaka, Japan

[22] Filed: July 18, 1973

[21] Appl. No.: 380,333

[30] Foreign Application Priority Data

July 20, 1972 Japan ............................... 47-73166
July 20, 1972 Japan ............................... 47-73167

[52] U.S. Cl. .................... 226/25, 226/111, 226/178, 226/181, 318/7

[51] Int. Cl. ............................................ B65h 25/22

[58] Field of Search ........... 226/24, 25, 36, 42, 108, 226/111, 181, 178, 188; 318/66, 68, 69, 70, 7

[56] References Cited

UNITED STATES PATENTS 3,387,758 6/1968 Delany et al ........................ 226/108
3,419,202 12/1968 Maxey ............................ 226/111 X
3,613,975 10/1971 Knight ................................. 226/25

*Primary Examiner*—M. Henson Wood, Jr.
*Assistant Examiner*—Gene A. Church
*Attorney, Agent, or Firm*—Wenderoth, Lind & Ponack

[57] ABSTRACT

A tape transport system has a supply reel, a take-up reel, an upstream capstan, a downstream capstan, an upstream motor and a downstream motor. A tape can run from the supply reel to the take-up reel via the upstream and downstream capstans. Two pinch rollers are provided which cooperate with the upstream and downstream capstans. The upstream and downstream capstans rotate independently of each other and the peripheral speed of the downstream capstan is faster than the peripheral speed of the upstream capstan; and the peripheral speeds of the upstream and downstream capstans decrease with an increase of the load torque by nearly the same rate, so as to run the tape substantially without slippage between the tape and both the upstream and downstream capstans.

6 Claims, 7 Drawing Figures

TAPE TRANSPORT SYSTEM

This invention relates to a tape transport system, and particularly to such a system for recording and reproducing a signal on a magnetic tape.

A magnetic tape or an equivalent recording medium in a tape transport system is run past transducer heads. Deviations in the speed of the tape from a predetermined speed are undesirable because they cause distortion of the frequency and/or amplitude of the signals being recorded or reproduced. It is desired that the tape should be transported smoothly without wow and flutter. The smoothness of the tape transport is influenced by e.g. the contact condition of the tape with the transducer heads and deviations of the average tension and speed of the tape. Many attempts have heretofore been made for the purpose of reducing the wow and flutter. Among them, a tape transport system using a so-called double-capstan mechanism is known to be effective for the purpose as above described. However, a conventional double-capstan type tape transport system is still not satisfactory for the reasons as set forth below, and this invention provides improvements in a double-capstan type tape transport system.

For example, U.S. Pat. No. 3,409,239 discloses such a conventional double-capstan type tape transport system. In it, two capstans mounted on a tape path are driven by a motor through an elastic belt mounted on the two capstans and the motor, and two pinch rollers are provided which cooperate with the two capstans for pressing the tape against the respective capstans. The two capstans are called the upstream capstan and the downstream capstan relative to the direction of the tape transport. Further, a supply reel for supplying the tape and a take-up reel for rewinding the tape are provided so that the tape can run from the supply reel to the take-up reel via a path between the upstream capstan and the corresponding pinch roller for pressing the tape to the upstream capstan and between the downstream capstan and the corresponding pinch roller for pressing the tape to the downstream capstan. Transducer heads are provided at a position between the two capstans so as to be in contact with the tape. The two capstans and the motor are positioned in a triangular arrangement, and the elastic belt goes from the motor back to the motor via the upstream capstan and the downstream capstan in this order. Because of the elasticity of the elastic belt, the elastic belt between the downstream capstan and the motor trends to be more tensioned than the segment of the elastic belt between the two capstans so that the downstream capstan trends to rotate faster than the upstream capstan. When the tape is pressed to the two capstans by the two pinch rollers, the tape is tensioned between the two capstans and across the transducer heads. Since the two capstans give to the tape a tape tension sufficient to cause a close contact of the tape with the transducer heads, it is not necessary to give a further tape tension to the tape by e.g. back tension from the supply reel. Therefore, the back tension from the supply reel can be made much smaller than in the case of a single capstan type tape transport system. Furthermore, the tape tension between the two capstans varies with the variation of the back tension of the supply reel less than the tape tension does in the case of a single capstan type tape transport system. Moreover, any horizontal vibration coming from the supply reel is shut out by the upstream capstan and the corresponding pinch roller, and is not propagated to the tape on the transducer heads.

However, it is to be noted that there is some difference in the rotational speed between the upstream and downstream capstans, which is produced by the elastic belt. The rotational speeds of the two capstans cannot be independent of each other. The tape running condition depends not only on the tape tension but also on the belt tension between the two capstans. Accordingly, the tape is apt to be run with an unstable slip relative to the capstans. Such slip of the tape easily causes the tape to move up and down and to be damaged. Furthermore, it is difficult to make an elastic belt with sufficiently high precision, and the characteristics of the belt do not remain stable for a long time. In view of the foregoing, it is clear that the conventional double-capstan type tape transport system still has many disadvantages Therefore, an object of this invention is to provide a tape transport system which can reduce the undesired wow and flutter and which is stabilized.

Another object of this invention is to provide a tape transport system in which the initial characteristics can be maintained for a long time.

Other objects and features of this invention will become apparent from the following detailed description taken together with the accompanying drawings, in which.

In the drawings, similar reference numerals identify similar elements.

Figure 1:
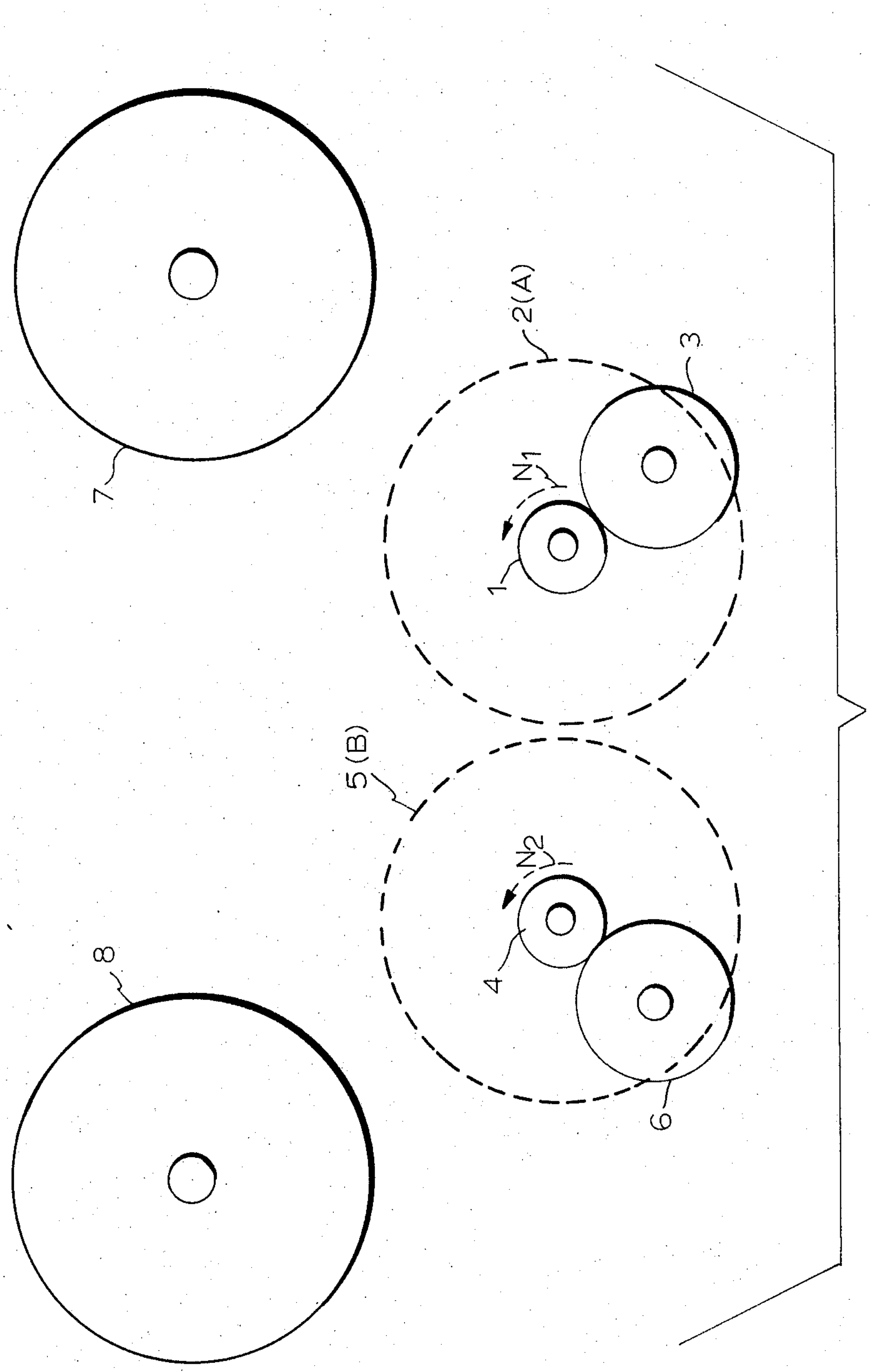
FIG. 1 is a schematic top plan view of one embodiment of a tape transport system of this invention when a tape is not mounted thereon.
Figure 2:
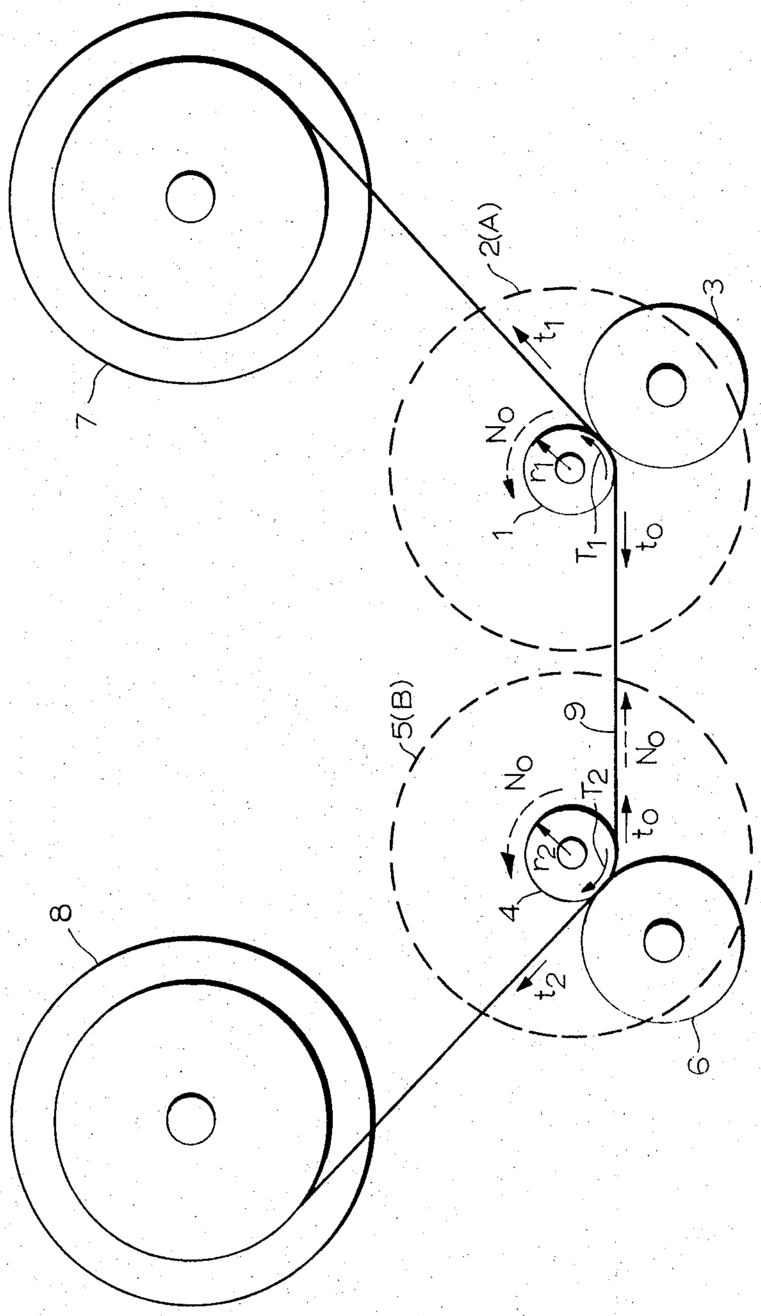
FIG. 2 is a schematic top plan view of the tape transport system of FIG. 1 when a tape is mounted thereon.

FIG. 1 shows one embodiment of a tape transport system of this invention when a tape is not mounted thereon. FIG. 2 shows the tape transport system of FIG. 1 when a tape is mounted thereon. Referring to FIGS. 1 and 2, reference numeral 1 designates a downstream capstan which is coaxial with (i.e. coaxially mounted on) a downstream motor A having a flywheel 2. Reference numeral 4 designates an upstream capstan which is coaxial with (i.e. coaxially mounted on) an upstream motor B having a flywheel 5. Reference numerals 3 and 6 designate pinch rollers corresponding to the downstream and upstream capstans 1 and 4, respectively, and which are provided for pressing a tape 9 against the peripheries of the downstream and upstream capstans 1 and 4, respectively. Reference numerals 7 and 8 respectively designate a take-up reel for rewinding the tape 9 and a supply reel which can have the tape 9 wound thereon and which is provided for suppling the tape 9. The tape 9 can run from the supply reel 8 to the take-up reel 7 via the upstream capstan 4 and the downstream capstan 1 and at the upstream and downstream capstans 4 and 1, the tape 9 is pressed against the peripheries of the upstream and downstream capstans 4 and 1 by means of the pinch rollers 6 and 3, respectively, as shown in FIG. 2. Dotted arrows in FIGS. 1 and 2 show the rotational directions of the downstream and upstream capstans 1 and 4 and the running direction of the tape 9. As is apparent from FIGS. 1 and 2, the rotational directions of both of the upstream and downstream capstans 4 and 1 coincide with the running direction of the tape 9 from the supply reel 8 to the take-up reel 7. Solid arrows represent the tension directions of the tensions in the tape 9 and the direction of the torques generated by the downstream and upstream capstans.

Figure 3:
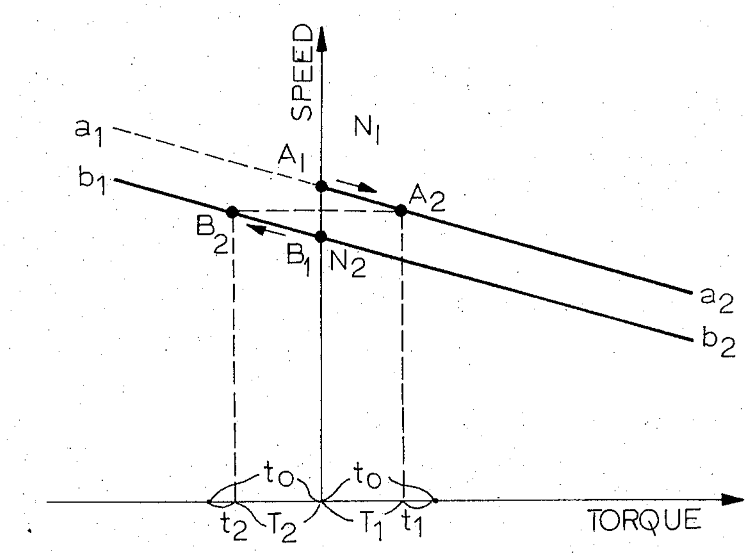
FIG. 3 is a graph showing one example of the peripheral speed vs. torque characteristics of the two capstans employed in the tape transport system of this invention.

FIG. 3 shows one example of the peripheral speed (rotational speed) vs. load torque characteristics of the upstream and downstream capstans 4 and 1. Referring to FIG. 3, a line $a_1$–$a_2$ and a line $b_1$–$b_2$ represent the characteristics of the downstream capstan 1 and the upstream capstan 4, respectively. As is apparent from these characteristics, the peripheral speed of the downstream capstan 1 is designed to be faster than the peripheral speed of the upstream capstan 4 at any given load torque point. Moreover peripheral speeds of the upstream and downstream capstans decrease a little with an increase of a load torque at nearly the same rate as shown in FIG. 3. The upstream motor B can generate a reversible torque as shown in the second quadrant of FIG. 3.

When the tape 9 is not present as shown in FIG. 1, the downstream capstan 1 has a peripheral speed $N_1$ (the operating point $A_1$ in FIG. 3), and the upstream capstan 4 has an independent peripheral speed $N_2$ (the operating point $B_1$ in FIG. 3) of $N_2$. $N_1$ is designed to be higher than $N_2$. For this reason and because the tape 9 is pressed onto the downstream and upstream capstans 1 and 4 by the pinch rollers 3 and 6, the tape tension of the tape 9 is increased unless the tape 9 between the upstream and downstream capstans 4 and 1 is slackened. This increase of the tape tension causes the speed of the upstream motor B to increase and the speed of the downstream motor A to decrease. As a result, the peripheral speeds of the upstream and downstream capstans 4 and 1 become substantially equal to the tape running speed $N_O$, and the tape between the upstream and downstream capstans 4 and 1 is given an optimum tape tension for transducer heads (not shown) which are usually positioned between the upstream and downstream capstans 4 and 1 so as to be in contact with the tape 9. Thus, in FIG. 3, the operating point $A_1$ of the downstream capstan 1 gets shifted to $A_2$, and the operating point $B_1$ of the upstream capstan 4 gets shifted to $B_2$ which is in the second quadrant, wherein the downstream and upstream capstans 1 and 4 generate torques $T_1$ and $T_2$, respectively. If we let $t_0$ represent the tape tension between the upstream and downstream capstans 4 and 1, $t_1$ the tension between the take-up reel 7 and the downstream capstan 1, and $t_2$ the tension between the supply reel 8 and the upstream capstan 4, we have:

$$t_O = T_1/r_1 + t_1 \quad (1)$$

$$t_O = -T_2/r_2 + t_2 \quad (2)$$

, where $r_1$ and $r_2$ are the radii of the downstream and upstream capstans, respectively. The peripheral speed vs. load torque characteristics of the downstream and upstream capstans 1 and 4 are:

$$N_0 = N_1 - k_1T_1 \quad (3)$$

$$N_0 = N_2 - k_2T_2 \quad (4)$$

where $k_1$ and $k_2$ are coefficients representing the speed gradient to torque for the downstream and upstream capstans 1 and 4, respectively. From the equations (1), (2), (3) and (4), we obtain:

$$t_0 = (k_1r_1/k_1r_1+k_2r_2)t_1 + (k_2r_2/k_1r_1+k_2r_2)t_2 + (N_1-N_2)/(k_1r_1+k_2r_2) \quad (5)$$

$$\delta t_0/\delta t_1 = (k_1r_1/k_1r_1+k_2r_2)\ ,\ \delta t_0/\delta t_2 = (k_2r_2/k_1r_1+k_2r_2) \quad (6)$$

$$N_0 = (k_1k_2r_1r_2/k_1r_1+k_2r_2)(t_1-t_2) + (k_2r_2N_1+k_1r_1N_2)/(k_1r_1+k_2r_2) \quad (7)$$

$$\delta N_0/\delta t_1 = k_1k_2r_1r_2/(k_1r_1+k_2r_2)\ ,\ \delta t_0/\delta t_2 = -k_1k_2r_1r_2/(k_1r_1+k_2r_2) \quad (8)$$

If $k_1 \approx k_2 = k$ and $r_1 = r_2 = r$, equations (6) and (8) become:

$$\delta t_0/\delta t_1 = ½\ ,\quad \delta t_0/\delta t_2 = ½ \quad (6)'$$

$$\delta N_0/\delta t_1 = ½\ kr\ ,\quad \delta N_0/\delta t_2 = -½\ kr \quad (8)'$$

The difference between $N_1$ and $N_2$ provides a tape tension for bringing the tape into close contact with the transducer heads, even if $t_1$ and $t_2$ are relatively small as is evident from equation (5). Furthermore, equation (6)′ indicates that the influence of $t_1$ or $t_2$ upon $t_0$ is reduced to about half. Equation (8)′ indicates that the gradient of speed $N_0$ to torque $t_1r_1$ or $t_2r_2$ coming from tension of the take-up reel 7 or the supply reel 8 is also reduced to about half. Therefore, it can be said that the influence of the supply and take-up reels 7 and 8 upon the tape 9 is reduced, resulting in an improvement of the tape transport system. Flywheels 2 and 5 are effective for reducing the wow and flutter of the downstream and upstream motors A and B. In the above embodiment, the case when the tape 9 is run in only one direction has been described. However, a reverse direction operation can easily be achieved by reversing the rotational directions of the upstream and downstream capstans 4 and 1 and also by rotating the upstream and downstream capstans 4 and 1 with the above described peripheral speeds of the downstream and upstream capstans 1 and 4, respectively. If the same motors are used for the upstream and downstream motors B and A, a bi-directional operation can easily be achieved by exchanging the electrical circuits for driving the upstream and downstream motors B and A i.e. by simply switching the electrical connections of the electrical circuits. Because the tape transport system of this invention has no unstable members such as an elastic belt as in the conventional double-capstan type tape transport system, the total characteristics of the system of this invention (e.g. wow and flutter or stability) can be kept constant for a long time. Moreover, the tape 9 can be run substantially without slippage between the tape 9 and each of the upstream and downstream capstans 4 and 1 against the action of the tape tension of the tape 9. Therefore, the tape 9 is hardly shifted up and down at all or damaged. These are advantages of the tape transport system of this invention.

The tape transport system of this invention can be further improved in the manner which will be described hereinafter.

In the system as described above, the smaller the coefficients $k_1$ and $k_2$, the smaller $\delta N_0/\delta t_1$ or $\delta N_0/\delta t_2$ becomes, as is evident from equation (8). However, if $k_1$ and $k_2$ are too small, the factor $(N_1-N_2)/k_1r_1+k_2r_2$ in equation (5) becomes too large. Therefore, it is very desirable that the speed difference $(N_1-N_2)$ between the downstream and upstream capstans be kept small and at a precise value. Deviations of the speeds of the downstream and upstream motors A and B from predetermined values should be avoided as much as possible. For this purpose, the speed control circuits for controlling the speeds of the upstream and downstream capstans which will be described hereinafter are very suitable.

Figure 4:
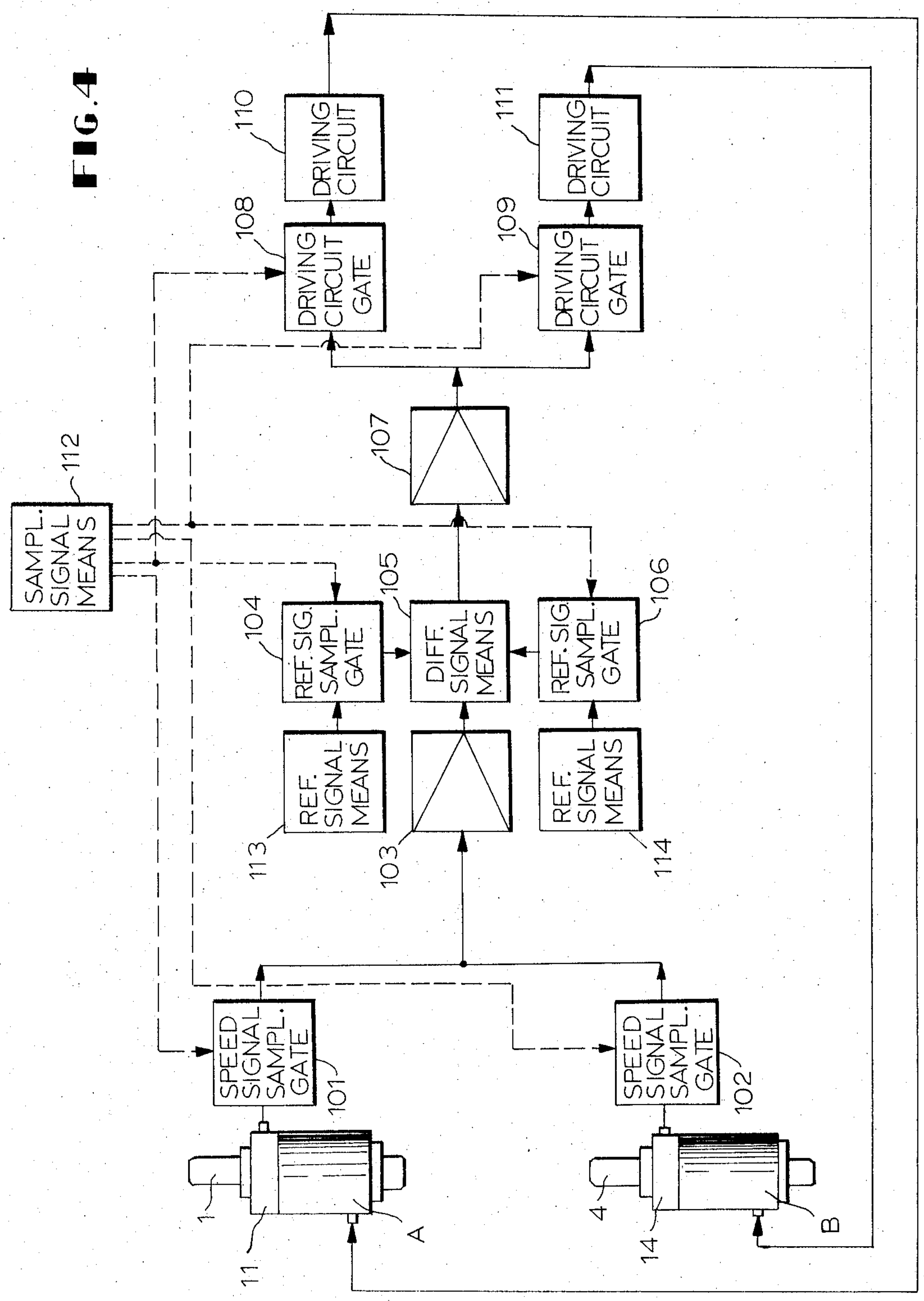
FIGS. 4 and 5 are schematic diagrams, in block form, of speed control circuits for controlling the peripheral speeds of the capstans.

Referring to FIG. 4, reference numerals 11 and 14 designate two speed detecting means complex to the downstream and upstream capstans 1 and 4 (or motors A and B), respectively, for detecting the peripheral speeds of the downstream and upstream capstans 1 and 4 (i.e. the rotational speeds of the downstream and upstream motors A and B), respectively, and producing speed signals for the downstream and upstream capstans 1 and 4. In FIG. 4, the speed detecting means 11 and 14 detect the speeds of the capstans 1 and 4 and produce appropriate D.C. signals. Any available and suitable circuits can be used for the speed detecting means 11 and 14. For example, tachogenerators including rectifiers or any other frequency-D.C. signal converters can be used therefor. The speed signals from the speed detecting means 11 and 14 are transmitted to two speed signal sampling gates 101 and 102, respectively, coupled to the two speed detecting means 11 and 14, respectively, for sampling the speed signals and producing sampled speed signals for the downstream and upstream capstans 1 and 4, respectively. Any available and suitable circuits can be used for the speed signal sampling gates 101 and 102. The sampled speed signals from the speed signal sampling gates 101 and 102 are transmitted to a pre-amplifying means 103 coupled to the speed signal sampling gates 101 and 102 for amplifying the sampled signals and producing pre-amplified signals for the downstream and upstream capstans 1 and 4, respectively. Any available and suitable D.C. signal amplifier can be used for the pre-amplifying means 103. The pre-amplified signals from the pre-amplifying means 103 are transmitted to a difference signal means 105 coupled to the pre-amplifying means 103. In addition, there are provided two reference signal means 113 and 114 for producing D.C. reference signals corresponding to predetermined speeds of the downstream and upstream capstans 1 and 4, respectively. Any available and suitable circuits can be used for the reference signal means 113 and 114. The reference signals from the reference signal means 113 and 114 are transmitted to two reference signal sampling gates 104 and 106, respectively, coupled to the reference signal means 113 and 114 for sampling the reference signals and producing sampled reference signals for the downstream and upstream capstans 1 and 4, respectively. Any available and suitable circuits can be used for the reference signal sampling gates 104 and 106. The sampled reference signals from the reference signal sampling gates 104 and 106 are also transmitted to the difference signal means 105 which is also coupled to the reference signal sampling gates 104 and 106 for (1) comparing the pre-amplified signal for the downstream capstan 1 with the sampled reference signal for the downstream capstan 1 and producing a difference signal which corresponds to the difference between the pre-amplified signal for the downstream capstan 1 and the sampled reference signal for the downstream capstan 1, and also (2) comparing the pre-amplified signal for the upstream capstan 4 with the sampled reference signal for the upstream capstan 4 and producing a difference signal which corresponds to the difference between the pre-amplified signal for the upstream capstan 4 and the sampled reference signal for the upstream capstan 4. Any available and suitable differential D.C. amplifier circuits can be used for the difference signal means 105. The difference signals for the downstream and upstream capstans 1 and 4 from the difference signal means 105 are transmitted to a further amplifying means 107 coupled to the difference signal means 105 for producing amplified signals for the downstream and upstream capstans 1 and 4, respectively. Any available and suitable D.C. amplifier circuits can be used for the latter amplifying means 107. The amplified signals for the downstream and upstream capstans 1 and 4 from the latter amplifying means 107 are transmitted to two driving circuit gates 108 and 109, respectively, coupled to the latter amplifying means 107 for sampling the amplified signals for the downstream and upstream capstans, respectively, and producing sampled amplified signals for the downstream and upstream capstans 1 and 4, respectively. Any available and suitable gates can be used for the driving circuit gates 108 and 109. The sampled amplified signals from the driving circuit gates 108 and 109 are transmitted to driving circuits 110 and 111, respectively, coupled to the driving circuit gates 108 and 109, respectively, and also to the motors for the downstream and upstream capstans 1 and 4 (i.e. motors A and B), respectively. The driving circuits 110 and 111 supply electric current to the armature of the motors A and B for achieving control of the peripheral speeds of the downstream and upstream capstans 1 and 4, respectively, in response to the magnitude of the sampled amplified signals from the driving circuit gates 108 and 109, respectively. if necessary the driving circuits 110 and 111 may include low pass filters or sample hold circuits or D.C. amplifying means to achieve a stable operation of the motors A and B. Any available and suitable gates can be used for the driving circuits 110 and 111.

In the operations as described above, normally if the several signals for the downstream capstan 1 are mixed up with the several signals for the upstream capstan 4 in e.g. the pre-amplifying means 103, difference signal means 105 and further amplifying means 107, the downstream capstan 1 (or motor A) and the upstream capstan 4 (or motor B) cannot be separately controlled so that the desired control of the peripheral speeds of the downstream and upstream capstans can not be achieved. However, in a manner which will be described hereinafter (which can be called time sharing), they can be separately controlled according to this invention.

That is, there is provided a sampling signal means 112 coupled to the two speed signal sampling gates 101 and 102, two reference signal sampling gates 104 and 106, and two driving circuit gates 108 and 109. The sampling signal means 112 alternately causes the gates to pass sampling signals for the downstream capstan 1 and sampling signals signal for the upstream capstan 4 without the respective signals overlapping. To this end, the two speed signal sampling gates 101 and 102, two reference signal sampling gates 104 and 106, and two driving circuit gates 108 and 109 are alternately gated by the sampling signals. The sampling operations of the speed signal sampling gate 101, reference signal sampling gate 104 and driving circuit gate 108 are carried out during time intervals when sampling signals are supplied from samepling signal means 112 for the downstream capstan 1, which time intervals do not overlap the time intervals during which the sampling signals are supplied for the upstream capstan 4 and the sampling operations of the speed signal sampling gate 102, reference signal sampling gate 106 and driving circuit gate 109 are carried out. These operations can therefore be called separated speed control of the downstream and upstream capstans 1 and 4 by means of time sharing. Any available and suitable circuits can be used for the sampling signal means 112. For example, multi-vibrators can be used therfor.

More specifically, during the time interval of one sampling signal for the downstream capstan 1, the speed signal sampling gate 101, reference signal sampling gate 104 and driving circuit gate 108 are switched on, whereas the other three gates 102, 106 and 109 are switched off. The output of the speed detecting means 11 is amplified in the pre-amplifying means 103. The difference signal between the pre-amplified signal from the pre-amplifying means 103 and the reference signal from the reference signal means 113 is supplied to the driving circuit 110 after being amplified in the further amplifying means 107 so that the speed of the downstream capstan 1 (motor A) is controlled by the output signal of the driving circuit 110. Because the reference signal from the reference signal means 113 is constant, the output signal from the driving circuit 110 is increased and decreased as the speed of the downstream capstan 1 (motor A) decreases and increases, respectively. In short, a negative feedback loop is formed for the speed control of the downstream capstan 1 (motor A).

Likewise, during time interval of a sampling signal for the upstream capstan 4, the speed signal sampling gate 102, reference signal sampling gate 106 and driving circuit gate 109 are switched on, whereas the other three gates 101, 104 and 108 are switched off. Similar operations to those described above for the downstream capstan 1 are carried out for the upstream capstan 4.

Therefore, it is clear that two negative feedback loops partially overlapping each other are provided in the speed control circuits used in the present invention. The beforementioned expressions become more clear from the signal processing chart of FIG. 6 for the embodiment of FIG. 5. D.C. signals ($S_A$) and ($S_B$) are examples of the speed signals of the capstans 1 and 4 detected in the speed detecting means 11 and 14 respectively. In a pulse train ($S_0$), the pulse trains ($S_{0A}$) and ($S_{OB}$) are made up of pulses which correspond to the above mentioned sampling signals for the downstream capstan 1 and the upstream capstan 4 respectively, and these pulse trains $S_{OA}$ and $S_{OB}$ alternately gate speed signal sampling gates 101 and 102, reference signal sampling gates 104 and 106 and driving circuit gates 108 and 109. As a result, pulses which are sampled speed signals ($S_{A1}$) and ($S_{B1}$) are transmitted to the pre-amplifying means 103. If the pre-amplifying means has a gain of OdB, the pre-amplified signal is ($S_{AB3}$). On the other hand, pulses which are sampled reference signals are represented by the solid lines of ($S_{A2}$) and ($S_{B2}$). (The dotted lines of ($S_{A2}$) and $S_{B2}$) represent the reference signals themselves.) ($S_{AB4}$) are the pulses which are the difference signals. ($S_{AB5}$) are amplified difference signal pulses. Pulses of two sampled amplified signals are represented by the solid lines of ($S_{A6}$) and ($S_{B6}$) and are provided to driving circuits 110 and 111.

The dotted lines of ($S_{A6}$) and ($S_{B6}$) show the case where each of driving circuits 110 and 111 includes a sampling hold circuit for holding the sampled amplified signal for each of said upstream and downstream capstans produced by one sampling operation until a succeeding sampling operation takes place so as to hold the sampled amplified signal for each of said upstream and downstream capstans substantially constant till the succeeding sampling operation occurs. Such sample hold circuits are very effective to reduce the ripple in the electric current for the armature of the motors A and B. Any available and suitable circuits can be used for the sample hold circuits.

Figure 5:
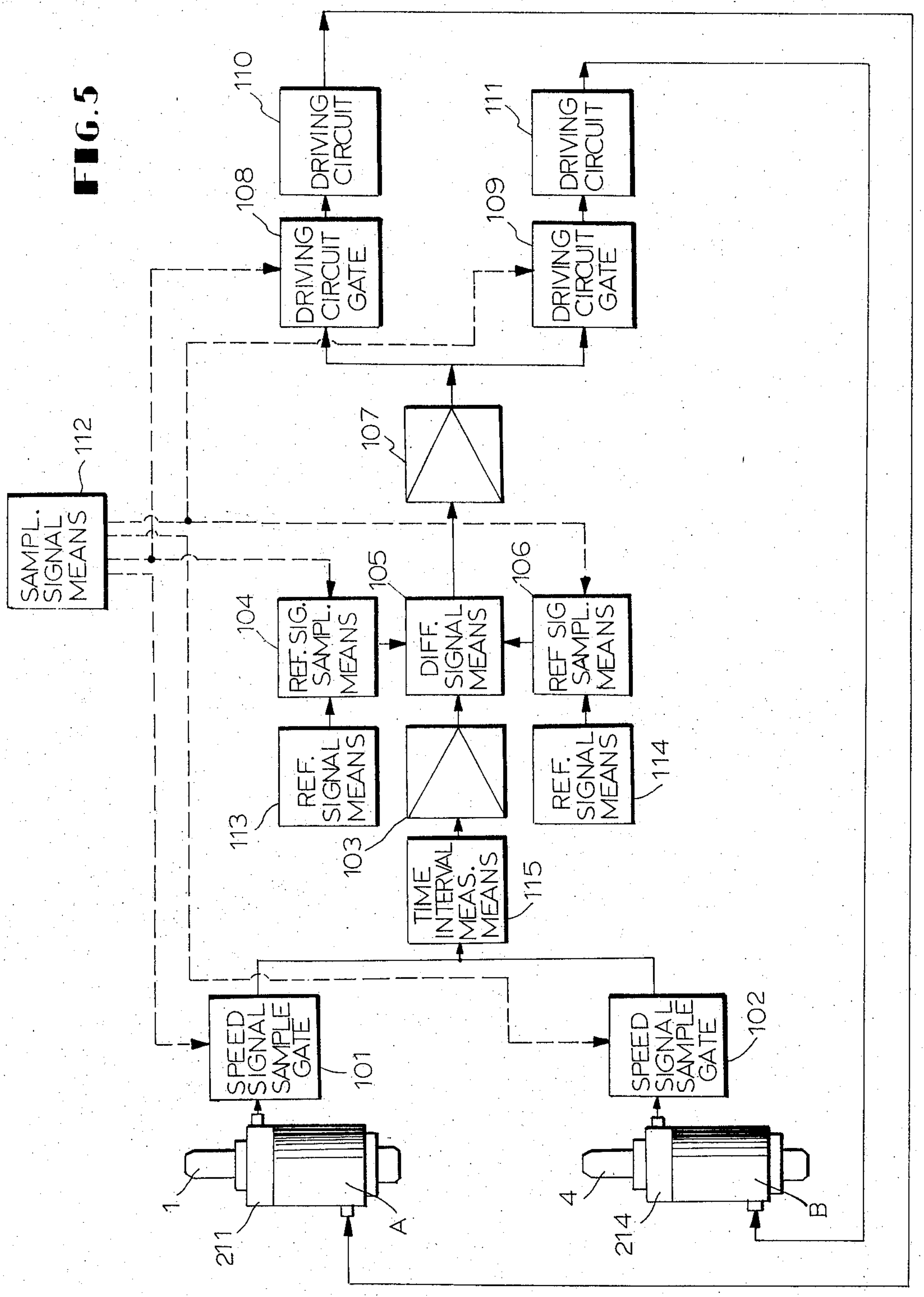

FIG. 5 shows still another embodiment of a speed control circuit usable in the tape transport system of this invention.

In FIG. 5, two speed detecting means 211 and 214 are used instead of the two speed detecting means 11 and 14 in FIG. 4, respectively. These speed detecting means 211 and 214 detect the speeds of the downstream and upstream capstans 1 and 4 (motors A and B) as time interval signals, such as periods of periodic signals, or the width of or intervals between pulses which correspond to the motor speed. These time interval signals are transmitted to the speed signal sampling gates 101 and 102. The speed signal sampling gates 101 and 102 produce sampled speed signals (time interval signals) under the control of the sampling signals from the sampling signal means 112. The sampled speed signals are converted to D.C. speed signals by a time interval measuring means 115 which is coupled between the pre-amplifying means 103 and the respective speed signal sampling gates 101 and 102 as shown in FIG. 5. The D.C. speed signals are then processed in a manner similar to the manner described before with reference to FIG. 4.

Figure 6:
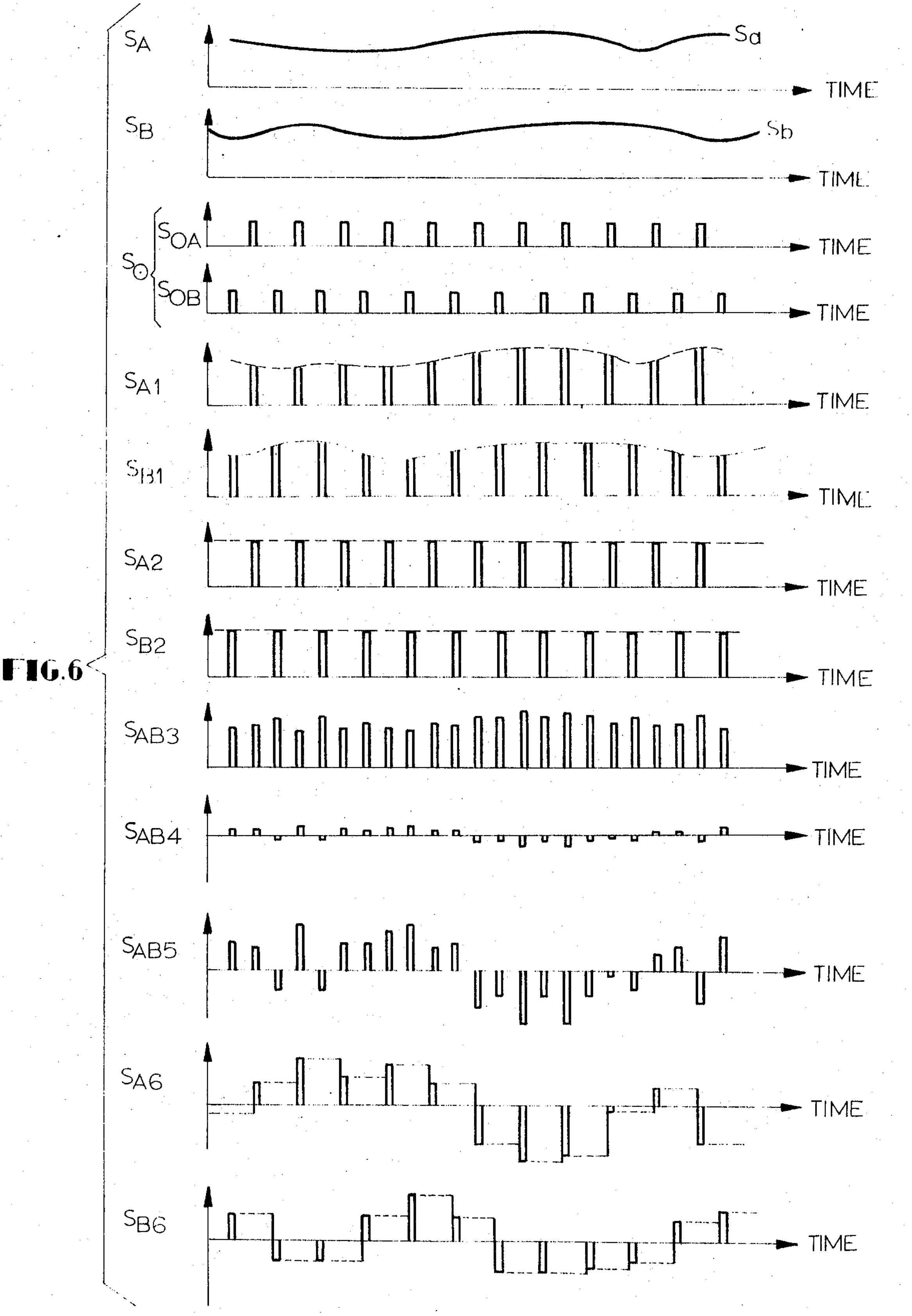
FIGS. 6 and FIG. 7 are schematic graphs showing examples of signal processing charts for a sampling signal means in the speed control circuit.
Figure 7:
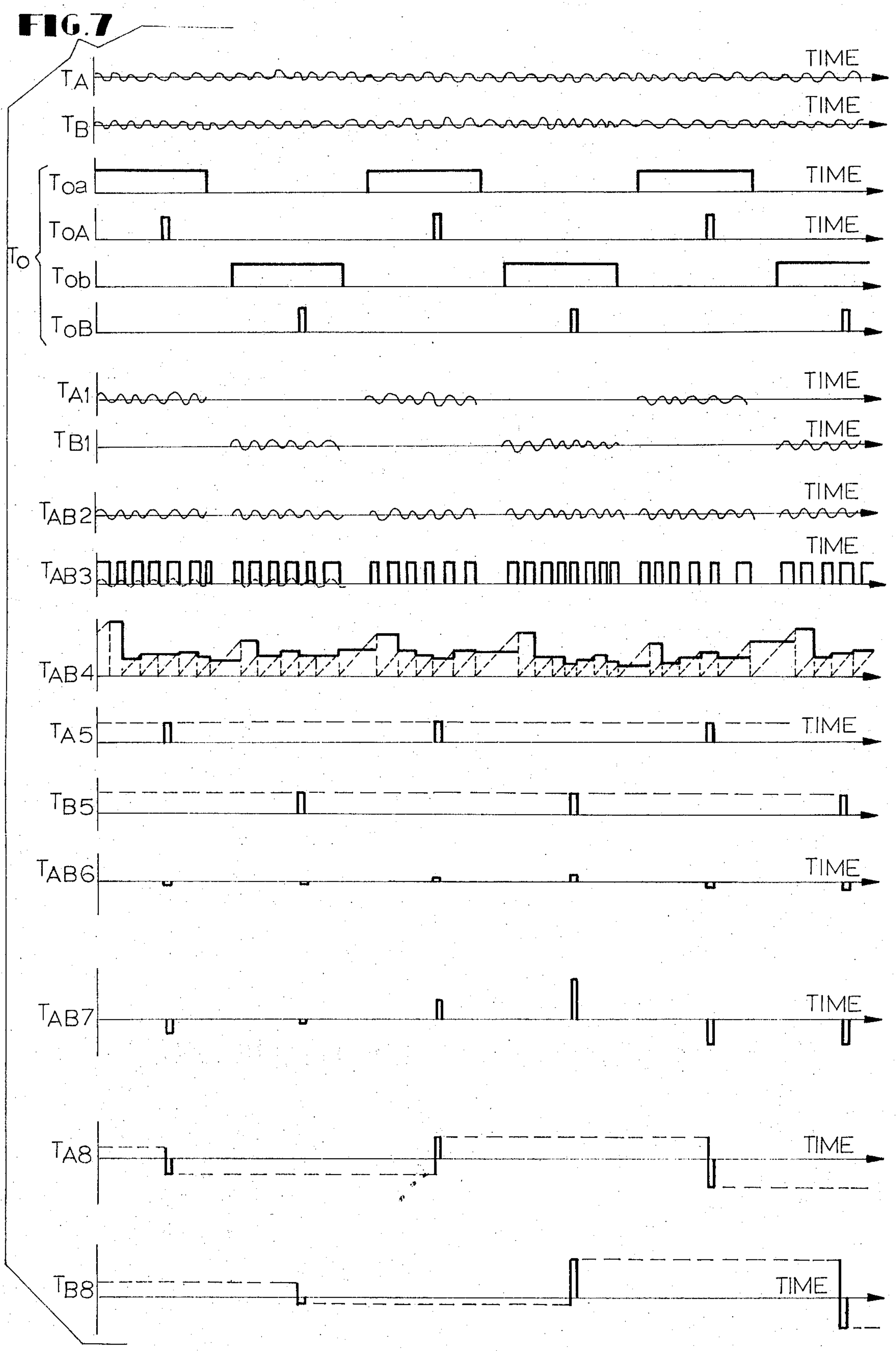

FIG. 7 shows a signal processing chart for the embodiment of FIG. 6. Periodical signals ($T_A$) and ($T_B$) are one example of the speed signals of the capstans 1 and 4 detected by the speed detecting means 211 and

214, respectively. ($T_{Oa}$) and ($T_{OA}$), and ($T_{Ob}$) and ($T_{OB}$) in a pulse train ($T_O$) correspond to the sampling signals for the downstream capstan 1 and upstream capstan 4, respectively. ($T_{Oa}$) and ($T_{Ob}$) alternately gate the speed signal sampling gates 101 and 102. ($T_{OA}$) and ($T_{OB}$) alternately gate the reference signal sampling gates 104 and 106 and driving circuit gates 108 and 109. Sampled speed signals ($T_{A1}$) and ($T_{B1}$) are transmitted to time interval measuring means 115 as a signal ($T_{AB2}$). In the time interval measuring means 115, the time interval signals are converted to D.C. signals. ($T_{AB2}$) is transformed into pulse signals like the solid line of ($T_{AB3}$). The time interval from one pulse to the next pulse is converted to D.C. signals (solid lines of ($T_{AB4}$)) by e.g. integrating a constant signal during the time interval from one pulse to to next pulse (dotted lines of ($T_{AB4}$)) and holding it. On the other hand, sampled reference signals are represented by the solid lines of ($T_{A5}$) and ($T_{B5}$). (The dotted lines of ($T_{A5}$) and ($T_{B5}$) represent the reference signals.) ($T_{AB6}$) is a difference signal. ($T_{AB7}$) is the amplified difference signal. Two sampled amplified signals are represented by the solid lines of ($T_{A8}$) and ($T_{B8}$) which are supplied to driving circuit 110 and 111 respectively. The dotted lines of ($T_{A8}$) and ($T_{B8}$) indicate the case where driving circuits 110 and 111 include sampling hold circuits. Any available and suitable circuits can be used for the speed detecting means 211 and 214. For example, tacho-generators can be used therefor. Any any available and suitable circuits can be used for the time interval measuring means 115. For example, an intergrator controlled by pulses can be used therefor. An advantage of employing the arrangement of FIG. 5 over the arrangement of FIG. 4 is that the tape tension $t_0$ and the speed $N_O$ change less with a change of e.g. temperature of the speed detecting means, in the case of FIG. 5, because the time interval of the time interval signals produced in the speed detecting means 211 and 214 in FIG. 5 is influenced much less by a change of e.g. temperature than is the amplitude of the D.C. signals produced in the speed detecting means 11 and 14 in FIG. 4.

In view of the foregoing, it can now be understood that in the speed control circuit comprising two negative feedback loops partially overlapping each other, two series of signals (one for the downstream capstan 1 and the other for the upstream capstan 4) are processed as one series of signals by means of time sharing in the overlapping portions and are selectively provided to the downstream and upstream capstans 1 and 4. The drift or temperature characteristics of the overlapping portions of the two negative feedback loops influence $k_1$ at exactly the same rate as upon $k_2$, and also influence $N_1$ at exactly the same rate as $N_2$. Therefore, e.g. ($N_1$—$N_2$) does not fluctuate in the overlapping portions, and the tape tension $t_0$ and the tape speed $N_0$ can be kept more stable because of the overlapping portions. That is, the speed control circuit with the overlapping portions controls the speed of the downstream and upstream capstans of the tape transport system of this invention more stably than a speed control circuit without the overlapping portions does.

In FIG. 6 and 7, the periods and pulse widths of the sampling signals are constant, but they can be changed by the speed signals from the speed detecting means so as to control the motors more precisely. But as such method is not so essential to this invention, a detailed description thereof is omitted.

While preferred embodiments of this invention have been shown and described, modifications may be made without a departure from the concept of this invention, and it is intended in the following claims to cover such modifications which fall within the spirit and scope of this invention.

What we claim is:

1. A tape transport system comprising:

a supply reel;

a take-up reel;

an upstream capstan;

a downstream capstan;

said capstans being positioned for guiding a tape from said supply reel to said take-up reel via said upstream capstan and said downstream capstan, and the rotational directions of both said upstream and downstream capstans coinciding with the running direction of said tape from said supply reel to said take-up reel;

an upstream motor coaxial with and driving said upstream capstan at a peripheral speed which decreases at a rate with an increase in the load torque therein; and a downstream motor coaxial with and driving said downstream capstan independently of said upstream capstan and at a peripheral speed greater than the peripheral speed of said upstream capstan, and which peripheral speed decreases with an increase of load torque at nearly the same rate as said upstream capstan, whereby said tape, is transported substantially without slippage between said tape and said upstream and downstream capstans against the action of tension in said tape.

2. A tape transport system according to claim 1, further comprising speed control means coupled to said motors for controlling the peripheral speeds of said upstream and downstream capstans, said speed control means having two negative feedback loops, one for said upstream capstan and the other for said downstream capstan, said two negative feedback loops partially overlapping each other; and means coupled to said feedback loops for processing signals representative of the peripheral speeds of said upstream and downstream capstans separately by means of time sharing.

3. A tape transport system according to claim 2, wherein said two negative feedback loops comprise:

two speed detecting means for detecting the peripheral speeds of said upstream and downstream capstans, respectively, and for producing speed signals representative of the speeds of said upstream and downstream capstans, respectively;

two speed signal sampling gates respectively coupled to said two speed detecting means, for sampling said speed signals and producing sampled speed signals for said upstream and downstream capstans, respectively;

a pre-amplifying means coupled to said two signal sampling gates for amplifying said sampled speed signals and producing pre-amplified signals for said upstream and downstream capstans;

two reference signal means for producing reference signals corresponding to predetermined speeds of said upstream and downstream capstans;

two reference signal sampling gates respectively coupled to said two reference signal means for sampling said reference signals and producing sampled reference signals for said upstream and downstream capstans, respectively;

a difference signal means coupled to said pre-amplifying means and said two reference signal sampling gates for comparing the pre-amplified signal for said upstream capstan with the sampled reference signal for said upstream capstan and producing a difference signal for said upstream capstan, and for comparing the pre-amplified signal for said downstream capstan with the sampled reference signal for said downstream capstan and producing a difference signal for said downstream capstan;

a further amplifying means coupled to said difference signal means for amplifying said difference signals for said upstream and downstream capstans and producing amplified signals for said upstream and downstream capstans;

two driving circuit gates coupled to said latter amplifying means for sampling said amplified signals for said upstream and downstream capstans, respectively, and producing sampled amplified signals for said upstream and downstream capstans, respectively;

two driving circuits respectively coupled to said two driving circuit gates for said upstream and downstream capstans and also to said upstream and downstream capstans, respectively for controlling the peripheral speeds of said upstream and downstream capstans, respectively, in response to said samplied amplified signals for said upstream and downstream capstans, respectively; and a sampling signal means which is coupled to said two speed signal sampling gates, said two reference signal sampling gates and said two driving circuit gates for alternately producing sampling signals for said upstream and downstream capstans for alternately operating said two speed signal sampling gates, said two reference signal sampling gates and said two driving circuit gates in accordance with signal processing times of said gates, whereby said feedback loops operate on a time sharing bais.

4. A tape transport system according to claim 3, wherein each of said two driving circuits include a sample hold circuit for holding the sampled samplified signal for each of said upstream and downsream capstans produced during one sampling operation until a succeding sampling operation takes place, whereby said sampled amplified signal for each of said upstream and downstream capstans is held substantially constant until said succeeding sampling operation.

5. A tape transport system according to claim 3, wherein said two speed detecting means compose means for detecting the peripheral speeds of said upstream and downstream capstans as D.C. signals.

6. A tape transport system according to claim 3, wherein said two speed detecting compose means for detecting the peripheral speeds of said upstream and downstream capstans as time interval signals, and there is further provided a time interval measuring means coupled between said pre-amplifying means and each of said speed signal sampling gates for converting said time interval signals to D.C. signals.

* * * * *